(12) United States Patent
Ganshaw

(10) Patent No.: US 6,183,202 B1
(45) Date of Patent: Feb. 6, 2001

(54) STRESS RELIEVED BLADE SUPPORT

(75) Inventor: Todd J. Ganshaw, Albuquerque, NM (US)

(73) Assignee: General Electric Company, Cincinnati, OH (US)

( * ) Notice: Under 35 U.S.C. 154(b), the term of this patent shall be extended for 0 days.

(21) Appl. No.: 09/302,966

(22) Filed: Apr. 30, 1999

(51) Int. Cl.$^7$ .................................................. B63H 1/20
(52) U.S. Cl. ...................................... 416/219 R; 416/248
(58) Field of Search ........................... 416/219 R, 204 A, 416/248, 244 R

(56) References Cited

U.S. PATENT DOCUMENTS 5,141,401  8/1992  Juenger et al. .
5,511,945 * 4/1996  Glezer et al. ..................... 416/219 R

OTHER PUBLICATIONS

Lammas et al., "Stress Relieved Dovetail," U.S. patent application Ser. No. 09/161,935 filed Sep. 28, 1998, (Docket 13DV–12899).

* cited by examiner

Primary Examiner—Edward K. Look
Assistant Examiner—Hermes Rodriguez
(74) Attorney, Agent, or Firm—Andrew C. Hess; Nathan D. Herkamp

(57) ABSTRACT

A rotor blade having a dovetail is mounted in a complementary slot in a rotor disk, with radially engaging outer and inner pressure faces, respectively. Relief grooves are provided for reducing stiffness at contact edges between the pressure faces to reduce peak stress thereat.

20 Claims, 2 Drawing Sheets

STRESS RELIEVED BLADE SUPPORT

The U.S. Government may have certain rights in this invention pursuant to contract number F33657-97-C-0016 awarded by the U.S. Department of the Air Force.

BACKGROUND OF THE INVENTION

The present invention relates generally to gas turbine engines, and, more specifically, to fan and compressor rotor blades therein.

In a typical turbofan gas turbine engine, a multistage axial compressor pressurizes air which is mixed with fuel in a combustor and ignited for generating hot combustion gases which flow downstream through a high pressure turbine which extracts energy therefrom for powering the compressor. A fan is disposed in front of the compressor and is powered by a low pressure turbine behind the high pressure turbine.

The fan and compressor stages each includes a row of circumferentially adjoining rotor blades extending radially outwardly from a supporting rotor disk. Each blade includes an airfoil over which the air being pressurized flows, and a platform at the root of the airfoil which defines the radially inner boundary for the airflow.

The blades are typically removable, and therefore include a suitable dovetail configured to engage a complementary dovetail slot in the perimeter of the rotor disk. The dovetails may either be axial-entry dovetails or circumferential-entry dovetails which engage corresponding axial or circumferential slots formed in the disk perimeter. A typical dovetail includes a neck of minimum cross sectional area extending integrally radially inwardly from the bottom of the blade platform which then diverges outwardly into a pair of opposite dovetail lobes or tangs.

For axial dovetails, the rotor disk includes a plurality of circumferentially spaced apart, axially extending dovetail slots defined circumferentially between corresponding disk posts. The axial slots and disk posts extend the full axial thickness of the disk between its axially forward and aft faces.

For a circumferential dovetail, a single dovetail slot extends circumferentially around the entire perimeter of the disk, and axially between forward and aft continuous posts. The circumferential slot is locally enlarged at one location for allowing the individual circumferential dovetails to be initially inserted radially therein and then repositioned circumferentially along the dovetail slot until the entire slot is filled with a full row of the blades.

In both types of dovetails, the corresponding disk posts include complementary lobes or tangs which cooperate with the dovetail lobes to radially retain the individual blades against centrifugal force during operation. Each dovetail lobe includes a radially outwardly facing outer pressure surface or face which engages a corresponding radially inwardly facing pressure surface or face of the disk posts. As centrifugal load is generated by the blade during rotation, it is carried radially outwardly from the dovetail lobes into the corresponding disk posts at the engaging outer and inner pressure faces thereof, and then radially inwardly through the disk.

Since the dovetail necks have minimum cross sectional area between the blade platforms and the dovetails themselves, maximum centrifugal stress is experienced at the necks which must be limited for ensuring a suitable blade life. A typical compressor blade is designed for an infinite life which requires suitably large dovetails and necks thereat for experiencing centrifugal stress suitably below the strength limits of the blade material.

The rotor disks, in contrast, have a finite limited useful life since they are more highly stressed than the blades which they retain. Since axially extending dovetail slots in a disk perimeter interrupt that perimeter along its circumference, an axial-entry rotor disk reacts the centrifugal loads in a different manner than that of the circumferential-entry rotor disks in which the two corresponding disk posts are full circumferential hoops having a correspondingly high hoop strength.

In one type of turbofan aircraft gas turbine engine which entered commercial service in this country in the previous decade, mid-life experience thereof first uncovered high cycle fatigue cracks in a statistically small, yet significant, number of axial dovetails and the rotor disks therefor. This is undesirable since a crack in a single dovetail uncovered in a periodic maintenance inspection requires replacement of a full set of the blades, or replacement of the rotor disk if the crack is found therein instead.

To improve the high cycle fatigue life of the rotor disk for axial dovetails, an improvement in the axial dovetail slots was patented by the present assignee in U.S. Pat. No. 5,141,401-Juenger et al.

Although that same type of engine includes both axial-entry and circumferential-entry dovetails, cracks in the latter were not observed at mid-life inspections in view of the different and stronger configuration of the circumferential-entry dovetails and slots therefor. However, further continued life of the same engines into the present decade have now uncovered yet again a statistically small occurrence of cracking in circumferential dovetails at very high-life cycles or time.

Analysis has determined that locally high stress occurs at both the radially outer and inner edges of contact between the dovetail and post pressure faces through which blade loads are carried. The stress field near the contact edges is further concentrated by small radii fillets in this region.

Accordingly, it is desired to provide an improved rotor blade and cooperating rotor disk for reducing edge of contact stress.

BRIEF SUMMARY OF THE INVENTION

A rotor blade having a dovetail is mounted in a complementary slot in a rotor disk, with radially engaging outer and inner pressure faces, respectively. Relief grooves are provided for reducing stiffness at contact edges between the pressure faces to reduce peak stress thereat.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
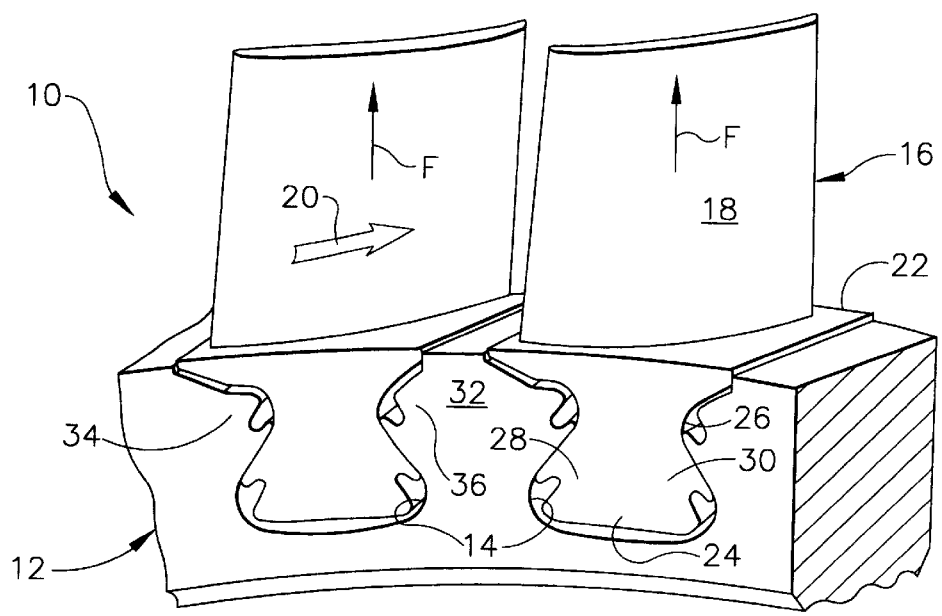
FIG. 1 is an isometric view of a portion of a gas turbine engine fan or compressor rotor disk having a plurality of axial dovetail slots for receiving rotor blades having axial-entry dovetails in accordance with an exemplary embodiment of the present invention.

Illustrated in FIG. 1 is a portion of a fan or compressor 10 of a gas turbine engine, such as a turbofan engine for powering an aircraft in flight. The compressor includes a rotor disk 12 having a plurality of circumferentially spaced apart dovetail slots 14 in the perimeter thereof.

A plurality of circumferentially adjoining rotor blades 16 are removably mounted in the corresponding disk slots 14. Each blade 16 includes an airfoil 18 over which air 20 is channeled during operation for pressurizing thereof. Integrally joined to the root of the airfoil is a corresponding platform 22 which defines the radially inner flowpath boundary for the air 20 being compressed.

Each blade 18 also includes an axial-entry dovetail 24 integrally joined to the platform 22 and extending radially inwardly therefrom. Each dovetail 24 includes a neck 26 of minimum radial cross sectional area extending circumferentially between a pair of dovetail tangs or lobes 28,30 configured to engage the disk slot 14 to radially retain the individual blades 18 to the disk perimeter.

The disk slots 14 are defined between corresponding disk posts 32. Each disk post includes a first disk tang or lobe 34 facing radially inwardly to engage a dovetail first lobe 28. Similarly, each disk post also includes a circumferentially opposite second tang or lobe 36 which engages the corresponding dovetail second lobe 30.

Figure 2:
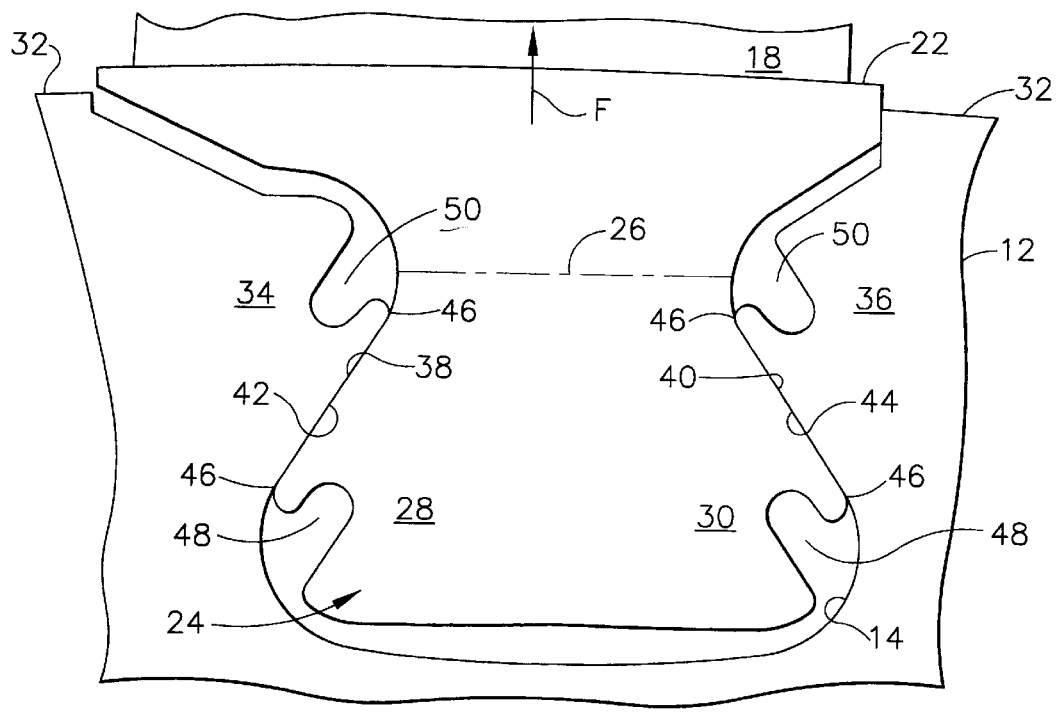
FIG. 2 is an enlarged, elevational view through one of the dovetails in the supporting disk illustrated in FIG. 1.

As illustrated in more particularity in FIG. 2, the dovetail lobes 28,30 include radially outer, first and second pressure faces 38,40 facing radially outwardly to engage corresponding radially inner, first and second pressure faces 42,44 facing radially inwardly from the corresponding disk lobes 34,36 defining the disk slot 14.

The outer and inner pressure faces are generally straight and extend axially along the full width of the dovetail 24 and the disk posts 32, and converge together radially outwardly on opposite sides of the dovetail in a conventional manner for radially retaining the dovetail in the disk slot. The surface area of contact between the pressure faces is conventionally selected in order to carry centrifugal forces F generated during rotary operation radially inwardly through the individual dovetails and the adjoining disk posts 32 into the disk 12 itself within suitable stress limits for ensuring a suitable useful life of both the blades and the disk.

Figure 3:
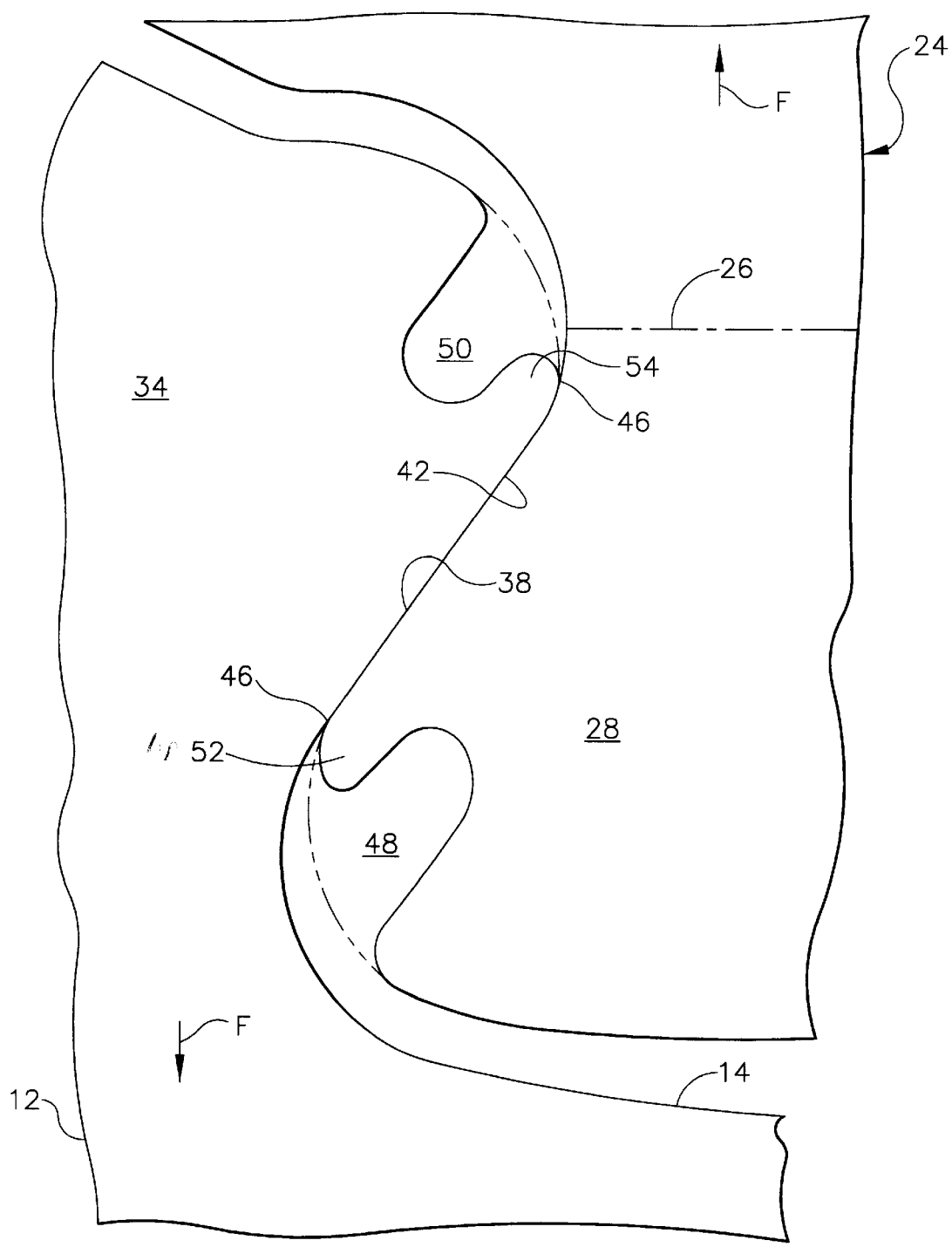
FIG. 3 is a further enlarged view of one of the dovetail lobes and adjacent disk post lobe in accordance with an exemplary embodiment of the present invention.

As shown in more detail in FIG. 3, the centrifugal force F is directed radially outwardly as the blades rotate with the disk, and is reacted radially inwardly by equal and opposite reaction forces, also designated F. The total blade force, including the centrifugal force and aerodynamic loads, is carried through the individual blade dovetails 24 across the pressure faces into the disk posts and radially inwardly.

Since the dovetail neck 26 has a minimum cross sectional area, it is typically highly stressed during operation. And, similarly, each of the disk posts has a corresponding minimum area neck which is also subject to relatively high stress during operation. These high stresses are limited by providing corresponding fillets on opposite sides of the necks with radii as large as practical given the limited geometrical envelope for their definition.

The disk lobes 34,36 engage the dovetail lobes 38,40 over the corresponding pressure faces terminating at radially outer and inner edges of contact 46 which extend axially across the full width of the dovetails. The outer contact edge 46 illustrated in FIG. 3 is disposed slightly inboard of the dovetail neck 26, with the inner contact edge 46 being disposed slightly outboard of the corresponding necks of the disk posts. At the outer and inner contact edges, the corresponding dovetail and post lobes diverge smoothly apart for maximizing available surface area for carrying the loads while reducing stress concentrations thereat.

However, as indicated above in the Background section, analysis has determined that locally high contact stress occurs at both the outer and inner contact edges in conventional dovetail and disk posts designs. The contact stress distribution decreases from local peaks at the contact edges to a substantially reduced value over the majority of the pressure faces radially between the corresponding contact edges. This stress distribution is directly analogous to the textbook case of a block on a flat surface. The bottom corners of the block effect a locally high contact stress in the flat surface which is substantially greater than the nominal stress across that surface.

In accordance with the present invention, means are provided for reducing stiffness at the contact edges 46 to correspondingly reduce peak stress thereat. In the preferred embodiment illustrated in FIGS. 1–3, the stiffness reducing means are in the form of relief grooves 48,50 spaced from corresponding contact edges 46 in at least one of the dovetails 24 and disk 12.

As initially shown in FIG. 2, each of the dovetails 24 includes a corresponding pair of radially inner or inboard relief grooves 48 disposed in corresponding ones of the first and second lobes 28,30 inboard of the corresponding inner contact edges 46. The inner relief grooves 48 in the dovetails extend the full axial width thereof.

Similarly, each of the disk posts 32 may include a pair of radially outer relief grooves 50 disposed in the post lobes 34,36 radially outwardly or outboard of the outer contact edges 46. The outer relief grooves 50 similarly extend the full axial width of the disk posts on opposite sides of each dovetail 24 retained in the disk slots 14.

As shown in FIG. 3, the inner grooves 48 are disposed radially below or underlie the inner contact edges 46 for reducing stiffness therebelow, or increasing flexibility. Similarly, the outer grooves 50 are disposed radially above or overlie the outer contact edges 46 for reducing stiffness thereabove, or increasing flexibility.

The relief grooves may have any suitable depth and are preferably spaced below the outer pressure faces 38,40 to define respective inner lips 52 cantilevered below the inner contact edges 46. Similarly, the outer grooves 50 are spaced above the inner pressure faces 42,44 to define respective outer lips 54 cantilevered above the outer contact edges 46.

In this way, the grooves 48,50 have sufficient depth in the dovetail and disk posts to reduce the stiffness at the defined lips 52,54 and therefore permit resilient bending thereof as the centrifugal forces are carried from the dovetails to the disk posts. The resilient lips 52,54 correspondingly substantially decrease the local peak stress at the outer and inner contact edges 46 as compared to conventional designs without the relief grooves.

The relief grooves 48,50 themselves provide stress concentrations thereat since they introduce local discontinuities in the parent metal material. Stress concentrations are conventionally defined by their radius of curvature, with smaller radii having higher stress concentration than larger radii.

In view of the limited geometrical material provided by the dovetails and disk posts, the size of the radii defining the respective grooves 48,50 is correspondingly limited. The reduction in peak stress at the contact edges 46 is necessarily accompanied by an increase in stress at other locations.

In accordance with another feature of the present invention, the relief grooves 48,50 significantly reduce peak stress in the narrow or local region around each of the contact edges 46, by correspondingly increasing stress over the remainder of the pressure faces 38,42. Since those pressure faces have a substantially large area compared to the lines or edges of contact 46, the stress increase thereat is substantially less than the large reduction in peak stress at the contact edges themselves.

Since the relief grooves 48,50 themselves provide stress concentrations, they are preferably isolated from the primary or direct loadpath or load transfer of the centrifugal force from the blade through the disk. Since the centrifugal force is carried radially inwardly past the dovetail neck 26 and the corresponding dovetail lobes 28,30 into the disk post lobes 34,36 and through the post neck, the relief grooves are positioned to avoid this direct loadpath.

As shown in FIG. 2, the dovetail grooves 48 preferably underlie solely the inner contact edges 46, with the outer contact edges 46 in the dovetail being without any relief grooves or discontinuity in the smooth arcuate transition fillet of the dovetail neck 26.

Similarly, the outer relief grooves 50 overlie solely the outer contact edges 46 in the dovetail posts, with the dovetail posts adjacent the inner contact edges 46 being without relief grooves for maintaining the smooth and uninterrupted transition fillet at the disk post necks.

In the exemplary embodiment illustrated in FIG. 3, the inner grooves 48 extend generally parallel to respective ones of the outer pressure faces 38 with sufficient depth to reduce stiffness at the corresponding inner lips 52. Similarly, the outer grooves 50 extend generally parallel to respective ones of the inner pressure faces 42 to provide sufficient flexibility of the outer lips 54 for reducing the edge of contact stresses.

In this way, the inner grooves 48 are disposed radially inwardly of the outer pressure faces 38,40 of the dovetail 24, and are removed or isolated from the direct loadpath through the pressure faces. And, since the lower end of the dovetail 24 is unloaded from the centrifugal loads of the airfoil carried through the dovetail, it is subject only to its own centrifugally generated force.

Accordingly, the centrifugal force at the bottom of the dovetail below the inner grooves 48 subjects those inner grooves to compression loads from centrifugal force generated during operation. Subjecting a stress concentration, such as the inner grooves 48, to compression loads is preferred over subjecting those same grooves to tension loads for improving blade life.

Similarly, the outer portion of the disk posts radially above the corresponding pressure faces 42,44 is isolated from the direct loadpath of centrifugal forces through the pressure faces. The outer grooves 50 are therefore isolated from the primary loadpath and are subject to compression loads due to centrifugal force acting in the disk posts which minimizes the adverse effect of the stress concentrations provided thereat, which is preferable over subjecting the outer grooves 50 to tensile centrifugal forces.

The relief grooves disclosed above in preferred embodiments may be used solely in the dovetails 24, solely in the disk posts 32, or in both as desired. The specific size and configuration of the relief grooves 48,50 may be determined for each specific design application for suitably reducing the local peak stress at the edges of contact without excessively increasing stress at other locations.

FIG. 3 illustrates in solid line and in phantom line the original, unaltered profile of the dovetail and disk post which is correspondingly modified by introducing the grooves 48,50 therein. The surface area of the engaging pressure faces remains the same in both designs for carrying the blade loads into the disk. The relief grooves are introduced only as necessary for reducing the peak contact edge stresses, with an attendant increase in nominal stress away therefrom. For a given dovetail and disk post design, improved life thereof may be obtained by the simple introduction of the relief grooves 48,50 in the preferred locations.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A gas turbine engine rotor blade mountable in a slot of a rotor disk, comprising:
   an airfoil;
   a platform integrally joined to said airfoil; and
   a dovetail integrally joined to said platform, and including
      a neck of minimum cross sectional area extending between a pair of dovetail lobes configured to engage said disk slot;
   each of said lobes including an outer face facing outwardly to engage corresponding inner faces of said disk slot between corresponding inner and outer edges of contact of said lobes; and
   a relief groove disposed in each of said lobes inboard said inner contact edge thereof for reducing stiffness at said inner contact edge to reduce peak stress thereat.

2. A blade according to claim 1 wherein said relief grooves underlie said inner contact edges for reducing stiffness therebelow.

3. A blade according to claim 2 wherein said relief grooves are spaced below said outer faces to define respective lips cantilevered below said inner contact edges.

4. A blade according to claim 3 wherein said relief grooves underlie solely said inner contact edges.

5. A blade according to claim 3 wherein said relief grooves are generally parallel to to the corresponding outer face of said lobes.

6. A blade according to claim 3 in combination with said rotor disk which further comprises:
   a plurality of posts spaced apart circumferentially by corresponding dovetail slots for receiving corresponding dovetails of said blades;
   each of said posts having opposite first and second lobes with inner faces facing radially inwardly to engage corresponding outer faces of said blade dovetails between said outer and inner edges of contact; and
   outer ones of said relief grooves are disposed in said post lobes outboard said outer contact edges.

7. A combination according to claim 6 wherein said outer grooves overlie said outer contact edges for reducing stiffness thereabove.

8. A combination according to claim 7 wherein said outer grooves are spaced above said inner faces to define respective outer lips cantilevered above said outer contact edges.

9. A combination according to claim 8 wherein said outer grooves overlie solely said outer contact edges.

10. A gas turbine engine rotor disk for supporting blades comprising:

a plurality of posts spaced apart circumferentially by corresponding dovetail slots for receiving corresponding dovetails of said blades;

each of said posts having opposite first and second lobes with inner faces facing radially inwardly to engage corresponding outer faces of said blade dovetails between edges of contact; and relief grooves disposed in said lobes outboard said contact edges.

11. A disk according to claim 10 wherein said relief grooves overlie said contact edges for reducing stiffness thereabove.

12. A disk according to claim 11 wherein said relief grooves are spaced above said inner faces to define respective lips cantilevered above said contact edges.

13. A disk according to claim 12 wherein each of said lobes has outer and inner edges of contact, and said relief grooves overlie solely said outer contact edges.

14. A disk according to claim 12 wherein said relief grooves are generally parallel to respective ones of said inner faces.

15. A rotor blade having a dovetail mounted in a complementary slot in a rotor disk, with radially engaging outer and inner pressure faces, respectively, extending between corresponding edges of contact, and means for reducing stiffness at said contact edges to reduce peak stress thereat.

16. An apparatus according to claim 15 wherein said means are subject to compression loads from centrifugal force generated in said blades.

17. An apparatus according to claim 15 wherein said means are isolated from primary load transfer of centrifugal force from said blade through said disk.

18. An apparatus according to claim 15 wherein said means comprise a relief groove spaced from said contact edges in one of said dovetail and disk.

19. An apparatus according to claim 18 wherein said relief groove is disposed in said dovetail inboard of inner ones of said contact edges.

20. An apparatus according to claim 18 wherein said relief groove is disposed in said disk outboard of outer ones of said contact edges.

* * * * *